(12) United States Patent
Hartmann et al.

(10) Patent No.: US 9,364,778 B2
(45) Date of Patent: Jun. 14, 2016

(54) FILTERING DEVICE FOR HIGHLY VISCOUS FLUIDS

(75) Inventors: Frank Hartmann, Steinfurt (DE); Robert Middler, Havixbeck (DE)

(73) Assignee: KREYENBORG VERWALTUNGEN UND BETEILIGUNGEN GMBH & CO. KG, Münster (DE)

(*) Notice: Subject to any disclaimer, the term of this patent is extended or adjusted under 35 U.S.C. 154(b) by 0 days.

(21) Appl. No.: 14/119,208

(22) PCT Filed: Jun. 1, 2012

(86) PCT No.: PCT/EP2012/060423
§ 371 (c)(1),
(2), (4) Date: Feb. 21, 2014

(87) PCT Pub. No.: WO2012/164079
PCT Pub. Date: Dec. 6, 2012

(65) Prior Publication Data
US 2014/0197092 A1    Jul. 17, 2014

(30) Foreign Application Priority Data

Jun. 1, 2011   (DE) .................. 10 2011 050 805

(51) Int. Cl.
*B01D 33/01* (2006.01)
*B29C 47/68* (2006.01)
*B29C 47/00* (2006.01)

(52) U.S. Cl.
CPC .............. *B01D 33/01* (2013.01); *B29C 47/682* (2013.01); *B29C 47/0009* (2013.01)

(58) Field of Classification Search
CPC ........ B01D 29/01; B01D 29/52; B01D 29/66; B01D 29/0068; B01D 35/12; B01D 33/21; B01D 33/0064; B01D 33/0048
USPC .................................................. 210/327, 322
See application file for complete search history.

(56) References Cited

U.S. PATENT DOCUMENTS 4,701,118 A * 10/1987 Koching et al. ................ 425/185
4,973,406 A * 11/1990 Ponzielli ..................... 210/333.1
(Continued)

FOREIGN PATENT DOCUMENTS

DE   19854242 A1   8/1999
EP    0672443 A1   9/1995
(Continued)

OTHER PUBLICATIONS

English-language abstract for EP0672443 (Wil Man Polymer Filtration) Sep. 20, 1995.
(Continued)

*Primary Examiner* — Robert Clemente
*Assistant Examiner* — Akash Varma
(74) *Attorney, Agent, or Firm* — Baker & Hostetler LLP

(57) ABSTRACT

The invention relates to a filtering device for highly viscous fluids, having at least two parallel screen plungers which are arranged in a displaceable fashion in screen plunger bores of a housing and which have in each case at least one screen cavity in which at least one filter element is arranged, wherein the housing has an inflow opening from which, on the untreated side, at least one flow duct leads to each screen plunger bore, and the housing has at least one flow duct which, on the clean side, leads from each screen plunger bore to an outflow opening. On the untreated side and/or on the clean side, in each case one common flow duct leads rectilinearly along both screen plunger bores and, in a production position, tangentially intersects the screen cavities.

14 Claims, 9 Drawing Sheets

(56) References Cited

U.S. PATENT DOCUMENTS

Figure 1:
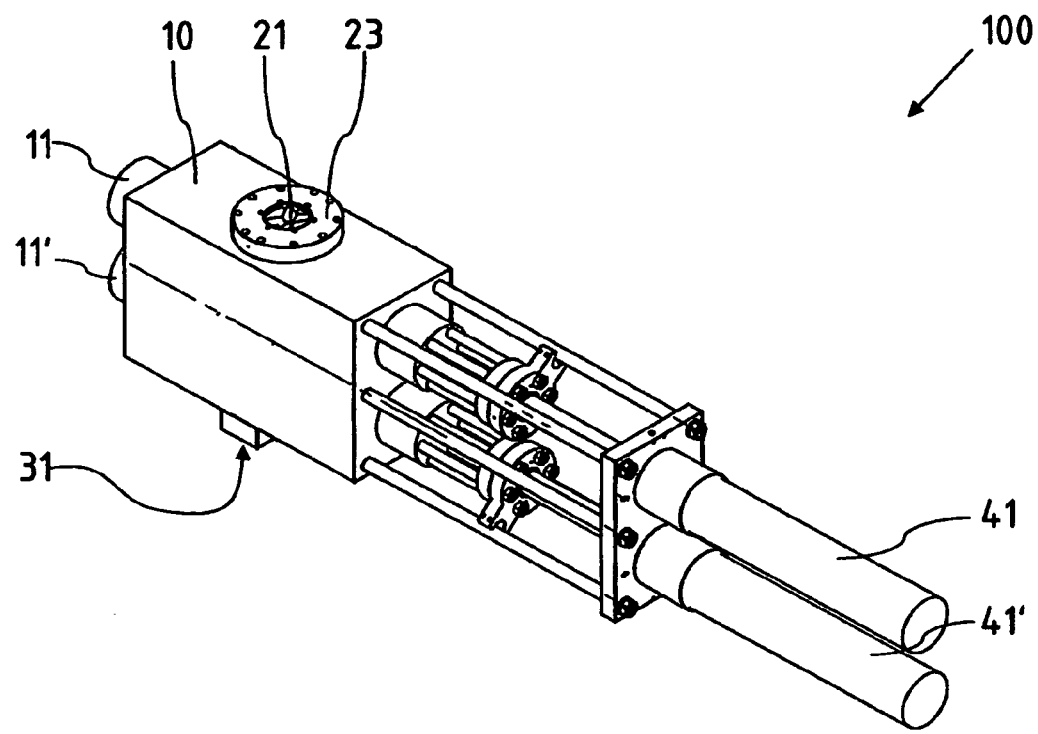

| | | | |
|---|---|---|---|
| 5,578,206 A * | 11/1996 | Ogoshi et al. | 210/236 |
| 5,779,898 A * | 7/1998 | Schwanekamp et al. | 210/324 |
| 6,290,846 B1 * | 9/2001 | Hangmann | B01D 29/05 |
| | | | 210/236 |

FOREIGN PATENT DOCUMENTS

| | | |
|---|---|---|
| EP | 0919353 A2 | 6/1999 |
| WO | 0216113 A2 | 2/2002 |

OTHER PUBLICATIONS

English-language abstract for EP0919353 (Wil Man Polymer Filtration) Jun. 2, 1999.

PCT International Search Report dated Nov. 5, 2012 for PCT/EP2012/060423, from which the instant application is based, 3 pages.

* cited by examiner

FILTERING DEVICE FOR HIGHLY VISCOUS FLUIDS

The invention concerns a filtering device for highly viscous fluids having at least two parallel screen bearing pistons, which are movably disposed in screen bearing piston holes of a housing, and which each exhibit at least one screen cavity in which the at least one filter element is disposed, wherein the housing exhibits an intake opening, from which, on the dirty side, at least one flow channel leads to each screen bearing piston hole, as well as a flow channel, which, on the clean side, leads from each screen bearing piston hole to a discharge opening.

Filtering devices of this type are known, for example, from DE 102 54 022 A1 or DE 103 17 170 A1. They contain, in particular, either two screen bearing pistons, each having a screen cavity, or a screen bearing piston having two screen cavities. By this means it is possible to maintain one of the screen cavities in the production operations, while the other is being cleaned. A filtering device of this type therefore enables a continuous operation of the facility, in which a highly viscous medium, in particular a plastic melt, must be purified.

The intake of the fluid normally occurs at an intake opening in a lateral surface of the housing. In order to supply the screen cavities in both screen bearing pistons from there, the feed line branches into sub-channels, each of which leads to the screen cavities. Because redirections of the sub-channels about small angles of less than approx. 110° should be avoided, in order to keep the flow resistance low, a certain housing width is necessary in order for the sub-channels to be able to lead to the screen bearing pistons within the housing. On the clean side of the screen cavities, the flow paths are designed identically. The sub-channels lead away from the screen cavities here, and are re-joined to one another, leading to a discharge opening. On this side, space is again necessary in the housing to the side of the screen bearing piston holes.

The housing volume to the side of the screen bearing pistons, which are normally disposed above one another, is however, unused, aside from the region for the relatively narrow flow path. The unused volume increases the mass of the filtering device and thus leads to high material costs as well. Moreover, a large mounting space is required for the filtering device, this being not only due to the width of the housing itself, but also because of the conduits and joints that are to be attached at the sides.

Lastly, the known concept of a housing for a filtering device is not suited for supplying numerous screen cavities, which are disposed in opposing pairs on a screen bearing piston.

The objective of the invention is thus to improve a filtering device of the type specified above, which can be formed in a narrower housing, requiring a smaller mounting surface for the filtering device, and/or which enables the screen cavities to be disposed not only adjacent and axially offset to one another on a screen bearing piston, but also enables them to be diametrically opposed on the screen bearing piston.

This objective shall be attained by means of a filtering device having the features of Claim 1.

The intake channel and/or the discharge channel runs parallel to an imaginary connecting line for the two midpoints of the screen bearing piston holes, through the housing, according to the invention, to the screen bearing piston holes such that these join one another at the sides, or pass through the edges thereof.

"Tangential" as defined for the present invention means not necessarily a single-point contact of an arc, as defined in the strictly geometrical sense, but rather, also includes penetrations in the manner of a secant, or combinations, wherein a portion of the hollow space of the flow channel passes by the screen cavity, and another portion intersects with the screen cavity. It is only essential that the channel passes by the screen cavity of the one screen bearing piston, and then runs directly to the screen cavity of the other screen bearing piston.

The tangential section of the screen cavities through the intake channel on the dirty side, or through the discharge channel on the clean side, or through both, reduces both the necessary width of the housing to basically the diameter of the screen bearing piston holes and also a certain mass for a sufficient wall thickness on both sides. According to the invention, the width of the housing can thus be substantially reduced.

Because only one straight intake channel and/or discharge channel is used collectively for all screen bearing pistons, the branching, or joining points can be eliminated. Flow mechanical hindrances are avoided thereby. In terms of production requirements, the production of a single straight hole is substantially simpler than the production of two branching sub-channels.

The preferred embodiment provides that the screen bearing pistons are disposed above one another in the housing, and the flow channels are oriented vertically. This does not exclude the possibility of an installation position that is rotated 90°.

A simple embodiment of a filtering device according to the invention provides that the intake opening and the discharge opening are disposed on an upper or lower surface of the housing. The intake channels or discharge channels all open into an upper or lower outer surface, or the intake channels lead to the one surface and the discharge channels lead to the other.

If numerous screen cavities are disposed on the screen bearing piston, offset to one another in the longitudinal direction, numerous flow channels are formed adjacent to one another. An adapter plate, which can be easily produced, can then be placed on the basic housing, in order to create the branching from the intake opening, or the discharge opening, respectively, to the numerous flow channels.

Another embodiment provides that the intake opening and/or the discharge opening are disposed on lateral surfaces of the housing, and a horizontal supplementary channel leads from the intake opening and/or the discharge opening to the vertical flow channels. This can be advantageous if the intake opening and/or the discharge opening are to be disposed on lateral surfaces for incorporating a filtering device according to the invention in an existing facility, which provides a horizontal conduit and a lateral line connection.

Figure 2:
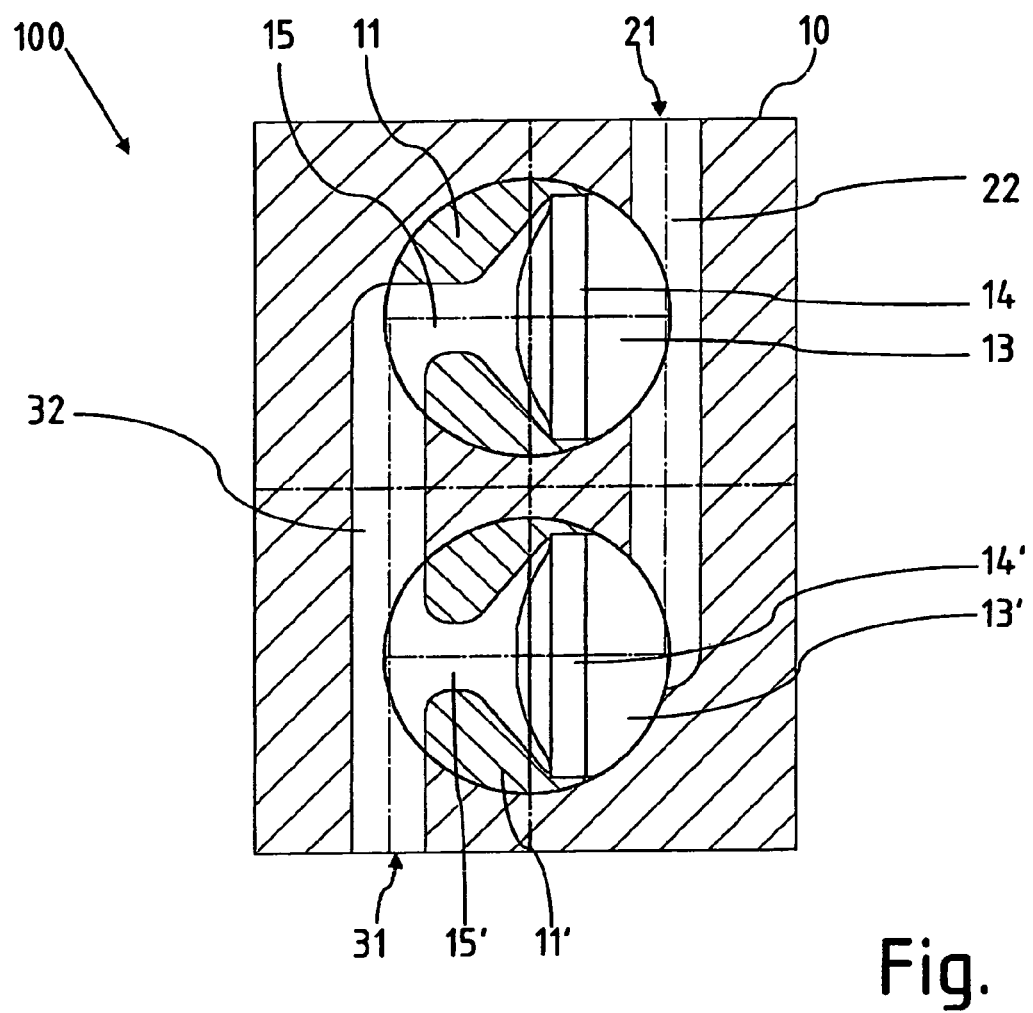
Figure 3A:
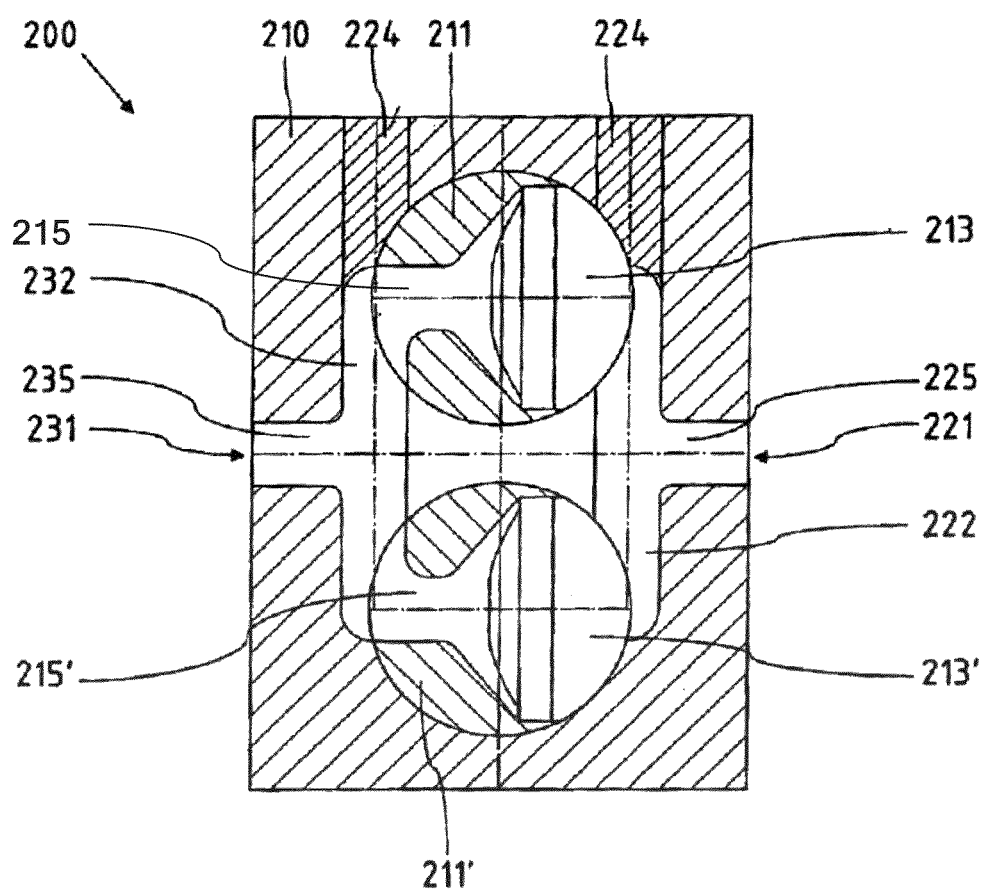
Figure 3B:
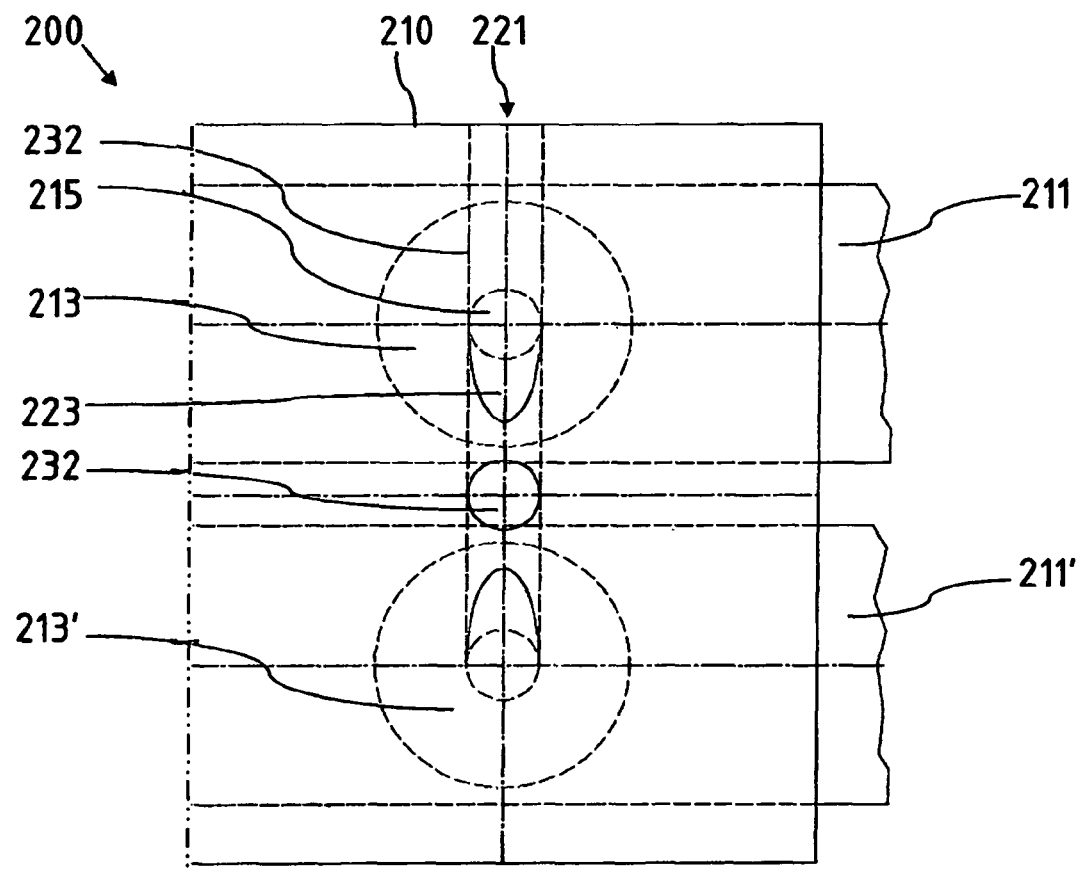
Figure 4A:
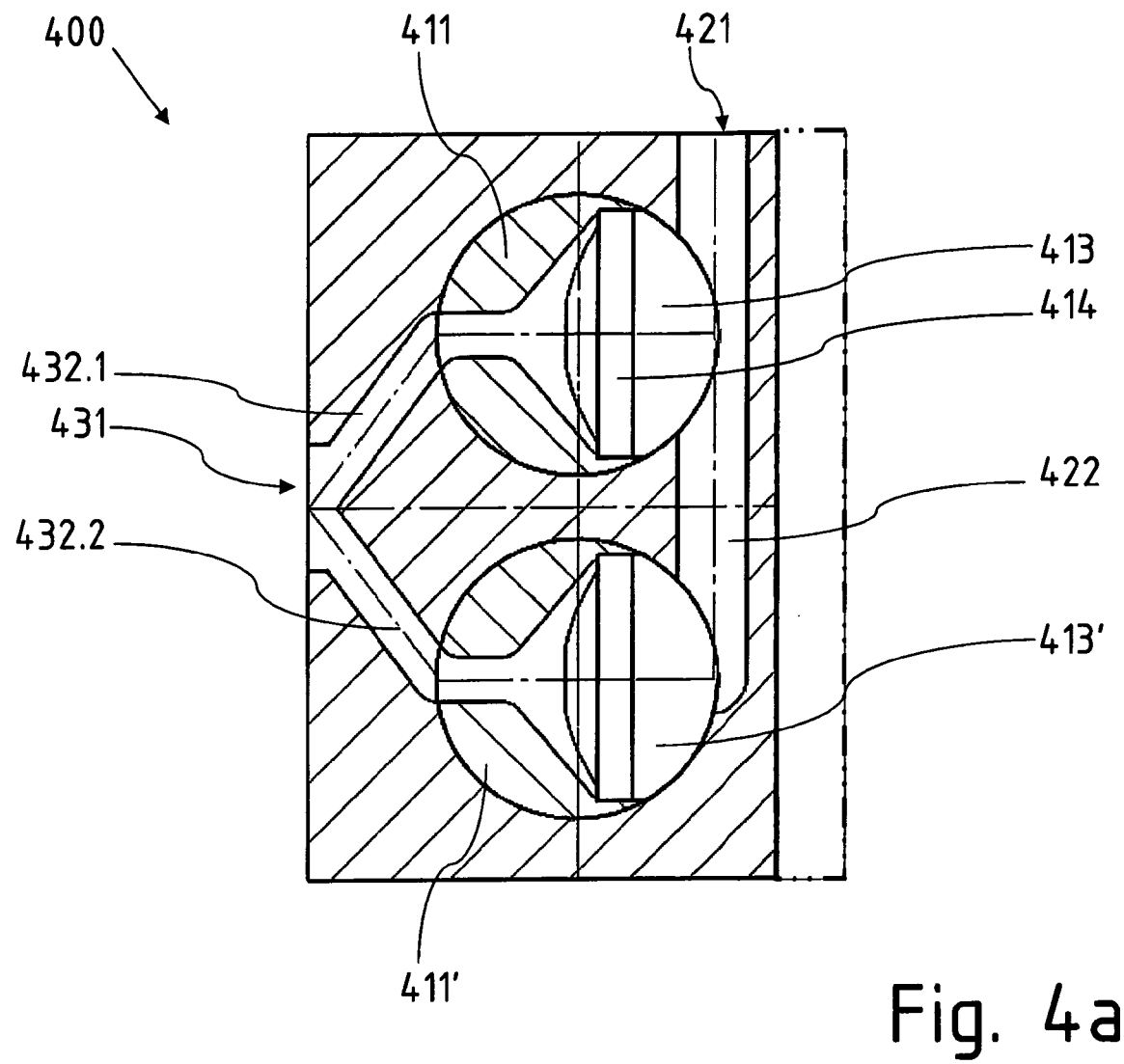
Figure 4B:
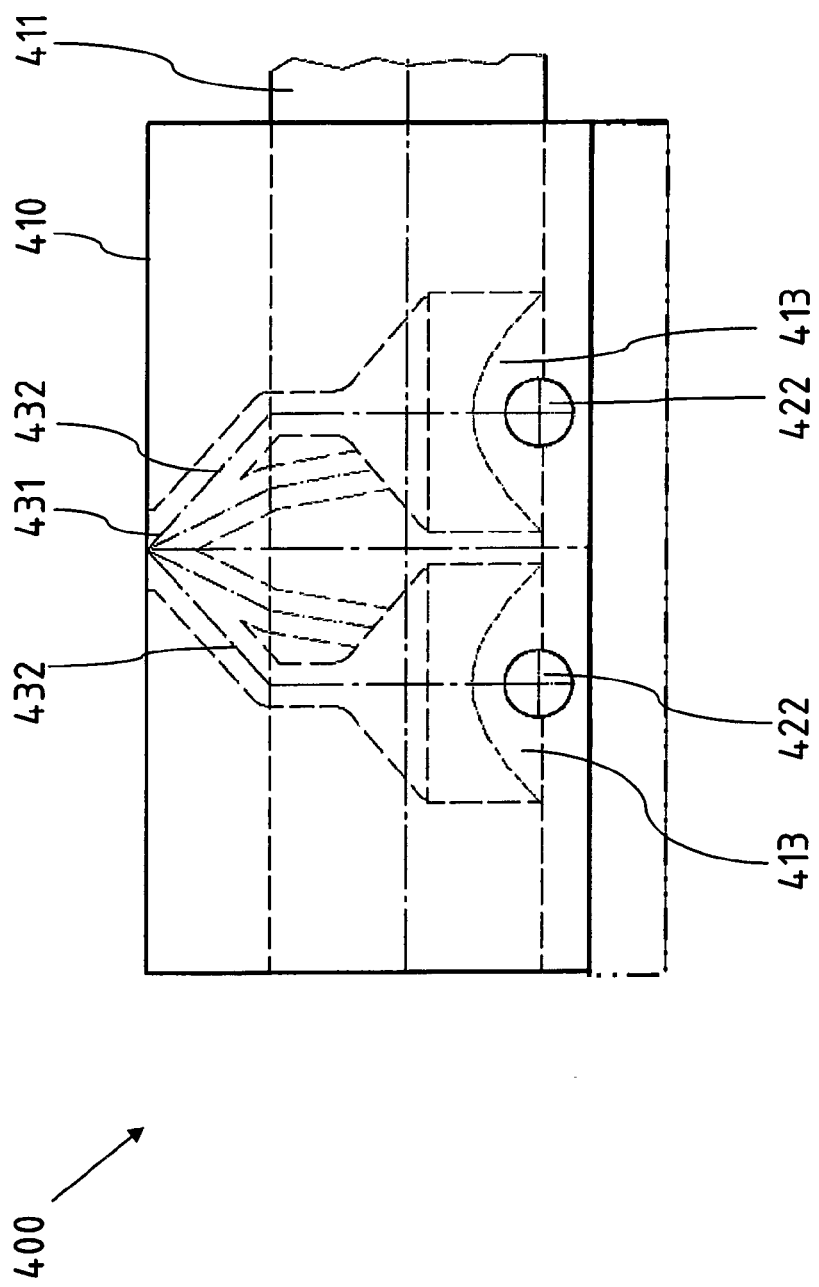
Figure 5:
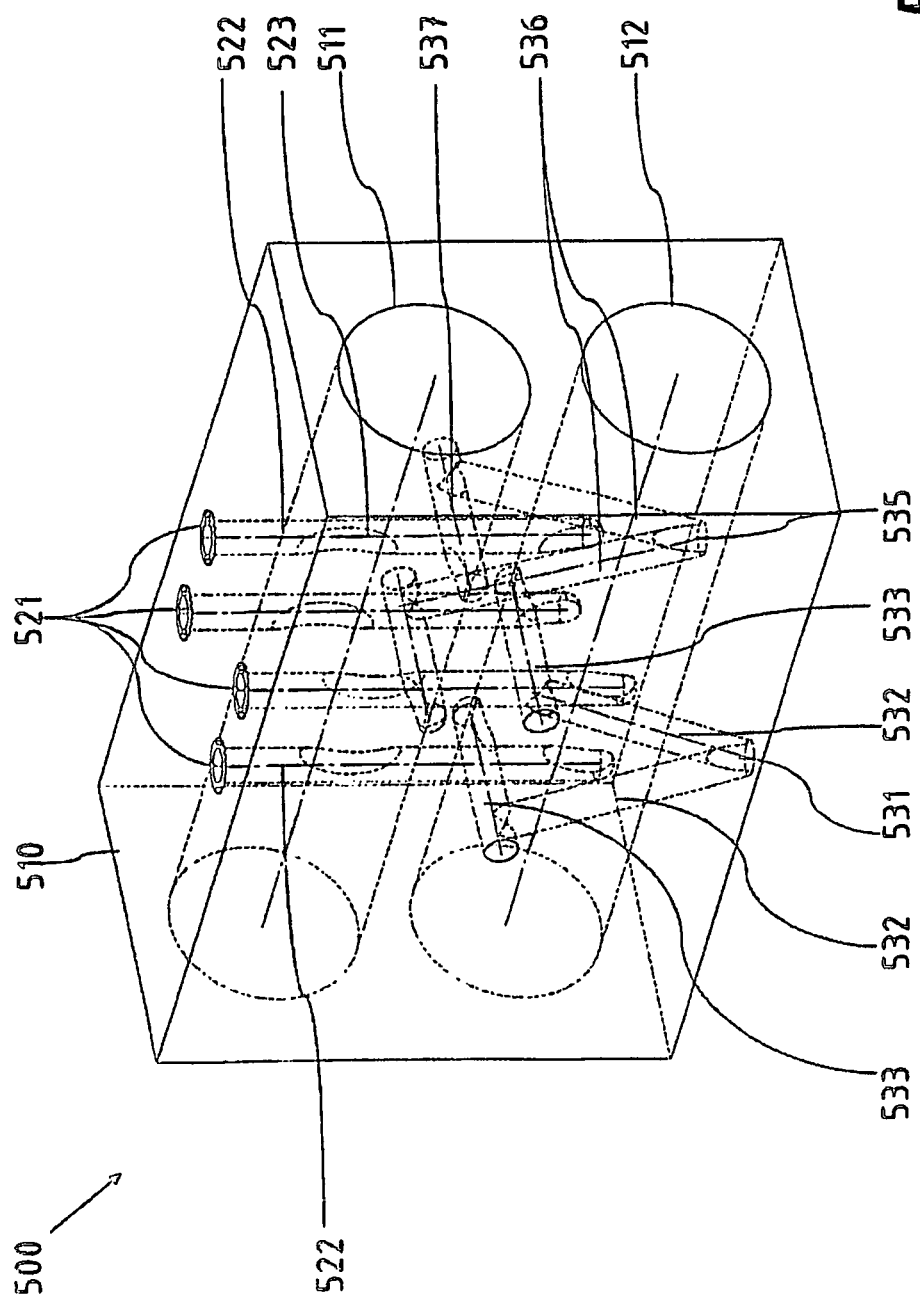
Figure 6A:
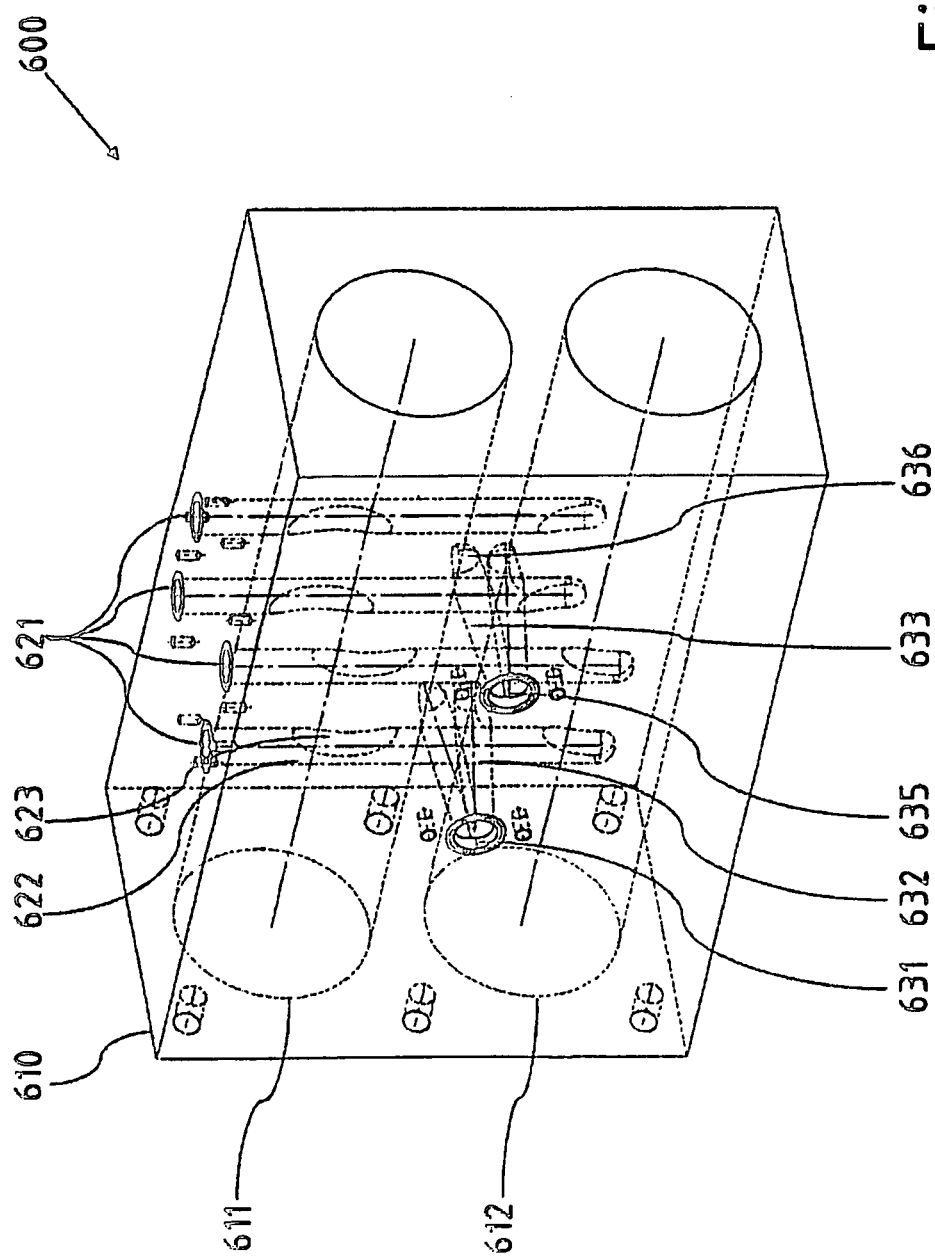
Figure 6B:
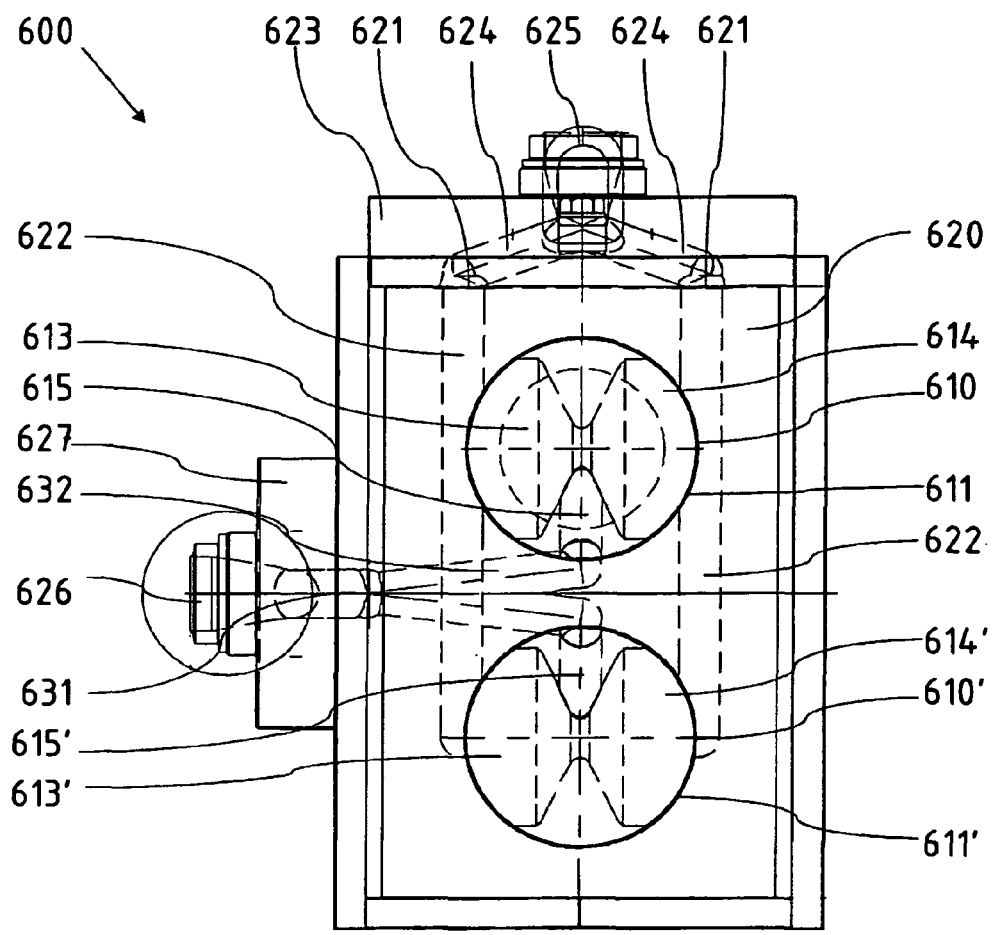

The invention shall be explained in greater detail in the following using embodiment examples and with reference to the drawings. The figures show, in detail:

FIG. 1 a filtering device according to a first embodiment, in a perspective view;

FIG. 2 the filtering device according to FIG. 1, in a cutaway;

FIG. 3*a* a second embodiment of a filtering device, in a cutaway;

FIG. 3*b* a section of the second embodiment in a side view;

FIG. 4*a* a third embodiment in a cutaway;

FIG. 4*b* a section of the third embodiment, in a top view;

FIG. 5 a housing for a filtering device according to a fourth embodiment, in a perspective view;

FIG. 6*a* a housing for a filtering device according to a fifth embodiment, in a perspective view; and FIG. 6*b* the filtering device according to the fifth embodiment, in a cross-section.

FIG. 1 shows a filtering device 100 according to the invention, in accordance with a first embodiment, comprising a housing 10, in which two screen bearing pistons 11, 11' are mounted. The screen bearing pistons 11, 11' can be displaced longitudinally in relation to the housing 10 by means of a hydraulic drive 41, 41'. The depicted embodiment of the filtering device 100 has an intake opening 21 on the upper surface of the housing 10, which is inserted in an adapter plate 23. A discharge opening 31 is provided on the lower surface of the housing 10.

FIG. 2 shows the housing with the screen bearing pistons 11, 11', in a cross-section. The adapter elements, which are to be attached to the upper and lower surfaces of the housing, are not depicted herein.

From the intake opening 11 on the upper surface of the housing 10, a vertical flow channel 22 extends downward, by means of which the screen cavities 13, 13' of the two screen bearing pistons 11, 11' are each tangentially intersected with, such that the fluid, which is introduced by means of the intake channel 22, ends up in the screen cavities 13, 13', and flows from there through the filter elements 14, 14' to the other side of the respective screen bearing piston 11, 11'.

At the discharge side, the so-called clean side, a flow channel 32 is provided in turn, which tangentially intersects the rear discharge openings 15, 15' of the two screen bearing pistons 11, 11'. Thus, it is possible to access the two screen cavities 13, 13' of the screen bearing pistons 11, 11', which lie above one another, with only two uniform flow channels 22, 32.

FIG. 3a shows modified embodiment of a filtering device 200, again with a housing 210 having a rectangular cross-section and having two screen bearing pistons 211, 211' mounted therein, which can be displaced longitudinally. With this embodiment both an intake opening 221 as well as a discharge opening 231 remain on the lateral surfaces of the housing 210, as is fundamentally known in the prior art. The production of the flow channels 222, 232, however is substantially facilitated in comparison with the prior art, however, through the flow channels 222, 232 provided according to the invention, which tangentially intersect the screen cavities 213, 213' and the discharge channels 215, 215' thereof. For the production thereof, vertical holes from the upper surface of the housing need only be created, this being such that the screen cavities 213, 213' are intersected on the dirty side, and the discharge openings 215, 215' are intersected on the other side of the screen bearing piston 211, 211'. The section of the flow channels 222, 232 leading to the upper surface of the housing are subsequently closed by means of suitable stoppers 224.

Short horizontal branch cannels 225, 235 lead from the intake opening 221, or from the discharge opening 231, respectively, to the vertical flow channels 222, 232, such that on the clean, as well as on the dirty side, in each case a T-shaped flow path is formed, through which the distribution of the fluid flow to the two screen bearing pistons is obtained.

FIG. 3b shows a view of the filtering device 200 from the side, looking at the discharge opening 232. Zones 223 indicate the regions in which the hollow spaces of the flow channel 232 and the discharge channel 215 pass through the screen bearing piston 211.

FIG. 4a shows another embodiment of a filtering device 400 with a housing 410, in which two cylindrical screen bearing pistons 411, 411' are mounted such that they can be displaced. As shown by the cross-section view in FIG. 4a, in this embodiment both a flow channel 422 on the dirty side, designed according to the invention, specifically on the right, and a branching on the clean side in sub-channels 432.1, 432.2, designed according to the prior art, which are reunited at the discharge opening 431, are provided.

FIG. 4b shows the filtering device 400 from above. Two screen cavities 413 lie adjacent to one another in the screen bearing piston 411, axially offset to one another. Accordingly, two flow channels 422, offset to one another, are provided on the dirty side. On the clean side there is, in contrast, the known per se branching into a total of four sub-channels 432, starting from the intake opening 431, which lead to two screen cavities 413 in the two screen bearing pistons lying above one another.

FIGS. 4a and 4b also clearly show that on the clean side a wider housing is required than on the dirty side, at the right in FIG. 4a, or toward the bottom in FIG. 4b, respectively, in order to accommodate the sub-channels 432, which branch according to the conventional structure. The broken line, comprised of dots and dashes, in FIG. 4a at the right, or in FIG. 4b at the bottom, indicates respectively the course of the imaginary outline of a housing, which would be designed in the conventional manner, having internal branchings on both sides. The continuous line, at which the cross-hatching ends, shows the actual necessary housing width according to the invention.

Even with the relatively simple embodiments described above, the advantages according to the invention are obtained in the production, and an overall significantly narrower design of the housing is made possible than is otherwise the case in the prior art.

The pathway of the flow channels is particularly suited for complex applications in filtering devices for highly viscous media, for enlarging the filtering surface area. The flow channel pathway according to the invention enables, firstly, with a reasonable expenditure in terms of production, not only two screen cavities for each screen bearing piston to be provided, but at least two pairs of screen cavities to be formed on each screen bearing piston, wherein the screen cavities for each pair are disposed on diametrically opposed sides of the screen bearing piston. In this manner, the effective filtering surface area in a filtering device according to the invention can be doubled in one fell swoop.

FIG. 5 shows a filtering device 500, which for purposes of clarity is not shown in its entirety here; specifically, it is depicted without screen bearing pistons. Only the housing 510 with its flow channels is illustrated. The housing 510 exhibits two parallel screen bearing piston holes 511, 512, above one another. A total of four intake openings 521 are disposed on the upper surface of the housing 510, which can be covered by an adapter plate, comparable to the adapter plate 23 in FIG. 1, which is not shown here, in order to lead the individual flow paths to a collective intake opening.

Four flow channels 522 extend vertically downward from the intake openings 521, such that a portion of their hollow space runs through the openings in the screen cavities, and a portion passes by the openings in the screen cavities. The numerals 523 indicate those volumetric regions that the flow channels 522 have in common with the respective screen cavities of the screen bearing piston, thus being where the imaginary hollow bodies enter the flow paths.

At the discharge side, the screen cavities are likewise intersected tangentially, specifically through horizontally running first flow channels 533, 537. These can be produced simply by means of holes, which are created in a lateral surface of the housing 510, and which are then closed at the ends thereof by means of a stopper.

With the embodiment shown in FIG. 5, the horizontal first flow channels 533, 537 are joined in pairs to form a discharge opening 531, 535. Those first flow channels 537 that are connected to the screen cavities of a screen bearing piston, which is inserted in the upper hole 511, are joined by means of the second flow channels 536, which are aligned to one another in a V-shape, to form a collective discharge opening 535. For a screen bearing piston inserted in the lower screen bearing piston hole 512, the first flow channels 533 run together on the upper surface of the screen bearing piston. They are also joined to form a collective discharge opening 531 by means of the second flow channels 532, which are aligned to one another in a V-shape.

In order to re-join the two discharge openings 531 535 at the lower surface of the housing 510, an adapter element can again be incorporated, in order to thus create a uniform discharge opening for a simplified connection to downstream conduits.

FIG. 6a shows a housing 610 of a filtering device 600, which is constructed in a manner similar to the housing in 510 in FIG. 5 with respect to its screen bearing piston holes 611, 612. The vertical flow channels 622, which lead from four intake openings 621 on the upper surface of the housing 610 to the interior, and there intersect the screen bearing piston holes 611, 612, are also designed in the same manner.

The channel pathway at the discharge end is different. In FIG. 6a, two discharge openings 631, 635 are provided in one of the lateral surfaces. These can, in turn, be selectively joined by means of an adapter element, such that a direct conduit connection is possible at the lateral surface. It is also possible, by means of an adapter plate, placed laterally in front thereof, to create a deflection of the fluid flow to the lower surface of the housing.

The connection of the two discharge openings 631, 635 to the screen cavities is obtained in this embodiment by means of the flow channels 632, 636, which are disposed in pairs, respectively, and which are aligned to one another, in turn, in a V-shape. They run at an acute angle to a location on the lower surface of the upper screen bearing piston 611, or to the upper surface of the lower screen bearing piston 612, respectively.

Therefore, the embodiment according to FIG. 6a only requires eight flow channels 622, 632, 636, drilled in a straight line, in order to conduct the fluid to all eight screen cavities in the two screen bearing pistons, and from there to allow the fluid to be discharged.

FIG. 6b shows a cross-section, cut through the entire filtering device 600, the housing 610 of which is shown in FIG. 6a. In this illustration an adapter element 623 is place on top of the housing 610. It contains a central intake opening 625, from which sub-channels 624 branch off to the four intake openings 621 on the upper surface of the housing. Furthermore, the filtering device has an adapter element 627 on the left-hand side, through which the flows from the two discharge openings 631, 625 are joined at a collective discharge opening 626.

In order to create a connection from the screen cavities 613, 614, or 613', 614', respectively, to the flow channels 632 at the discharge end in the housing 610, exit channels 615, 615' are provided in the screen bearing pistons 611, 611', respectively, which begin at the upper screen bearing piston 611 in the middle, between the two screen cavities 613, 614, and then lead downward to the circumference of the screen bearing piston 611, where there is an intersection with the flow channels 625. For these screen cavities 613', 614' in the lower screen bearing piston 611', a corresponding exit channel 615' leads upward.

The invention claimed is:

1. A filtering device for highly viscous fluids, said filtering device having a housing, two parallel screen bearing pistons and two piston holes, each of said screen bearing pistons having a screen cavity, and a screen disposed in said screen cavity, said screen cavity and said screen having a dirty side and a clean side, said two screen bearing pistons being disposed displaceably in said two piston holes, said housing having an intake opening, a discharge opening, a first flow channel, and a second flow channel, said first flow channel is a straight flow channel that extends along a first longitudinal axis, said first flow channel leading from said intake opening to said dirty sides of said screen cavities and intersects both of said piston holes.

2. The filtering device according to claim 1, wherein said two screen bearing pistons are disposed above one another in said housing and said first flow channel is disposed vertically when said filtering device is in the operational state.

3. The filtering device according to claim 1, wherein said housing has an upper surface and a lower surface, said intake opening and said discharge opening are disposed respectively on said upper surface of said housing and said lower surface of said housing.

4. The filtering device according to claim 1, wherein said housing includes a plurality of first flow channels, and said second flow channel includes a first discharge flow channel that intersects a first of said piston holes on said clean sides of said screen cavities.

5. The filtering device according to claim 4, further comprising a first exit channel extending from a first of said piston holes, and intersecting said first discharge flow channel at an angle of 90 degrees-120 degrees relative to said first discharge flow channel.

6. The filtering device according to claim 4, wherein said housing includes a plurality of second flow channels including a second discharge flow channel that intersects a second of said piston holes on said clean sides of said screen cavities.

7. The filtering device according to claim 6, further comprising a second exit channel extending from said second of said piston holes, and intersecting said second discharge flow channel at an angle of 90 degrees-120 degrees relative to said first discharge flow channel.

8. The filtering device of claim 1, wherein the second flow channel comprises two first discharge flow channels and two second discharge flow channels, each of said two first discharge flow channels connect to both a respective one of said bearing pistons, and a respective one of said two second discharge flow channels, said two second discharge flow channels intersecting at said discharge opening to form a V-shape.

9. The filtering device of claim 1, wherein said second flow channel is a straight flow channel that extends along a second longitudinal axis leading from said clean sides of said screen cavities to said discharge opening and intersects both of said piston holes.

10. The filtering device of claim 1, wherein said first longitudinal axis of said first flow channel is substantially parallel to a connecting line between two mid points of said two piston holes.

11. The filtering device of claim 1, wherein said first flow channel tangentially intersects both of said two piston holes.

12. A filtering device for highly viscous fluids, said filtering device having a housing, two parallel screen bearing pistons and two piston holes, each of said screen bearing pistons having a screen cavity, and a screen disposed in said screen cavity, said screen cavity and said screen having a dirty side and a clean side, said two screen bearing pistons being disposed displaceably in said two piston holes, said housing having an intake opening, a discharge opening, a first flow channel, and a second flow channel, said first flow channel leading from said intake opening and being a straight flow channel that extends along a first longitudinal axis to said dirty sides of said screen cavities and tangentially intersects both of said two piston holes, or said second flow channel leading from said discharge opening and being a straight flow channel that extends along a second longitudinal axis, said second flow channel leading from said clean sides of said screen cavities to said discharge opening and tangentially intersects both of said piston holes.

13. The filtering device of claim 12, wherein said first flow channel is a straight flow channel that extends along a first longitudinal axis leading from said intake opening to said dirty sides of said screen cavities and intersects both of said piston holes.

14. The filtering device of claim 12, wherein said second flow channel is a straight flow channel that extends along a second longitudinal axis leading from said discharge opening to said dirty sides of said screen cavities and intersects both of said piston holes.

\* \* \* \* \*